UNITED STATES PATENT OFFICE.

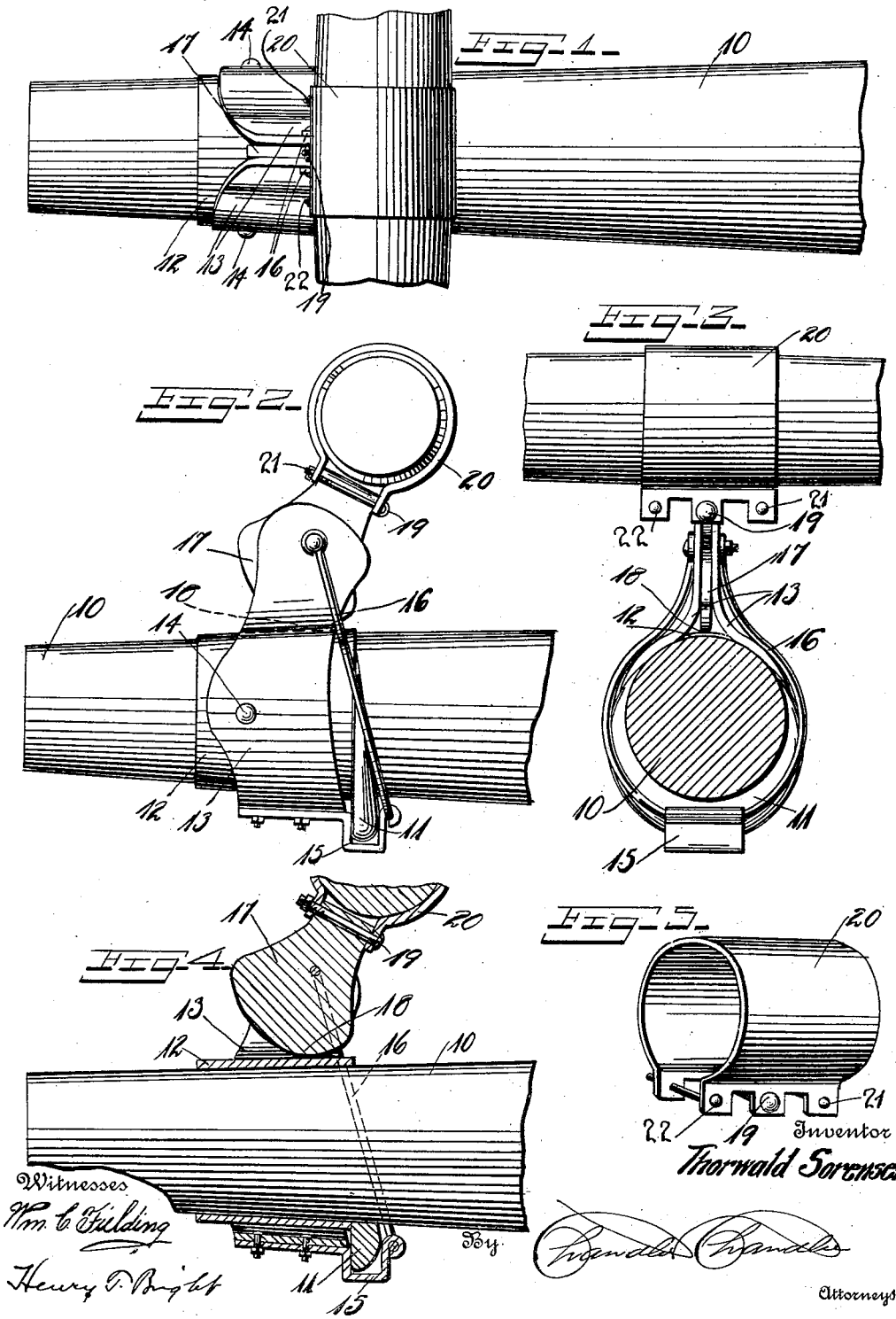

THORWALD SORENSEN, OF RINGSTED, IOWA.

NECK-YOKE.

977,482. Specification of Letters Patent. Patented Dec. 6, 1910.

Application filed July 28, 1910. Serial No. 574,282.

*To all whom it may concern:*

Be it known that I, THORWALD SORENSEN, a citizen of the United States, residing at Ringsted, in the county of Emmet, State of Iowa, have invented certain new and useful Improvements in Neck-Yokes; and I do hereby declare the following to be a full, clear, and exact description of the invention, such as will enable others skilled in the art to which it appertains to make and use the same.

This invention relates to neck-yokes.

The object of the invention is to provide a yoke of the character named which in the event of the tugs becoming detached will not be slid off the pole by the forward motion of the horses, thereby preventing accidents.

With the above and other objects in view the invention consists in the details of construction and in the arrangement and combination of parts as will be hereinafter more fully described and particularly pointed out in the appended claims.

In describing the invention in detail reference will be had to the accompanying drawings wherein like characters of reference denote corresponding parts in the several views; and in which, Figure 1 is a plan view of a fragment of a wagon pole with the invention incorporated; Fig. 2, a side elevation of what is shown in Fig. 1; Fig. 3, a rear elevation of what is shown in Fig. 1; Fig. 4, a vertical longitudinal section partly broken away; the pole being shown in elevation; and, Fig. 5, a detail perspective view of the split clip which embraces the yoke.

Referring to the drawings, 10 indicates the pole of a wagon provided on its under side with the usual projection 11. A metallic sleeve 12 surrounds the pole 10 forward of the projection 11 and a split band 13 encircles said sleeve and is pivotally connected to the pole by means of a pin 14. Said band 13 is of such size as to be capable of a limited rotation forwardly and rearwardly of the tongue 10. A U-shaped arm 15 projects rearwardly from the band 13 and embraces the projection 11 for a purpose that will presently appear. A substantially U-shaped link 16 is disposed around the pole 10 and has its free ends secured respectively to the free ends of the band 13 and its bight portion secured to the free end of the arm 15.

A plate 17 is pivoted between the free ends of the band 13 and has its lower side formed as a cam as at 18 for coöperation with the upper side of the metallic ring 12 when said plate is rotated in a forwardly direction with respect to the pole. Extending longitudinally through the upper end of the plate 17 is a pivot pin 19 and a split clip 20 has its free ends pivotally connected with said pin on opposite sides of the plate 17 respectively whereby said clip is adapted for a rocking movement transversely of the plate. The point of connection of the free ends of the clip 20 with the pin 19 is disposed intermediately of said ends so as to permit the terminals of said free ends to be connected together by bolts 21 and 22 whereby said terminals may be drawn toward each other and the clip thus bound upon a desired yoke.

From the foregoing description it will be apparent that should the tugs which secure the animals to the vehicle become detached, the plate 17 will be rotated forwardly with respect to the tongue 10 and such rotation of the plate will cause the cam face 18 thereof to co-act with the sleeve 12 which will result in the U-shaped arm 15 being drawn inwardly toward the under side of the tongue and thus prevent the detachment of the neck yoke by the engagement of the arm 15 with the projection 11.

What is claimed is:

1. In a neck-yoke center, the combination with a pole having a projection on its under side; of a split band pivotally connected to and surrounding said pole and adapted for limited rotation, a U-shaped arm secured to said band embracing said projection, a link connecting the free ends of said band with the free end of said arm, a plate pivoted between the free ends of the band and having a cam face for coöperation with the pole when said plate is rotated in a forwardly direction to draw the arm and band inwardly toward the under side of the pole, and a neck-yoke clip pivotally connected to said plate.

2. In a neck-yoke center, the combination with a pole having a projection on its under side; of a split band pivotally connected to and surrounding said pole and adapted for limited rotation, a U-shaped arm secured to said band embracing said projection, a link connecting the free ends of said band with the free end of said arm, a plate pivoted between the free ends of the band and having a cam face for coöperating with the pole when said plate is rotated in a forwardly direction to draw the arm and band inwardly toward the under side of the pole, a split yoke clip having its free ends pivotally connected to opposite sides of said plate respectively at their intermediate portions, and means for drawing the terminals of the free end of said clip toward each other.

In testimony whereof, I affix my signature, in presence of two witnesses.

THORWALD SORENSEN.

Witnesses:
J. E. HANSEN,
C. B. MURTAGH.